United States Patent [19]
Sawyer et al.

[11] Patent Number: 5,842,126
[45] Date of Patent: Nov. 24, 1998

[54] EXPEDITED HOME GATEWAY ACCESS METHOD AND SYSTEM

[75] Inventors: Steven Paul Sawyer, Fountain Hills; Peter Joseph Armbruster, Chandler, both of Ariz.

[73] Assignee: Motorola, Inc., Schaumburg, Ill.

[21] Appl. No.: 774,773

[22] Filed: Dec. 30, 1996

[51] Int. Cl.$^6$ ............................................. H04B 7/185
[52] U.S. Cl. ............................................. 455/428; 455/430
[58] Field of Search .................................. 455/12.1, 13.1, 455/427, 428, 429, 430, 432, 450, 452, 453, 67.1, 435

[56] References Cited

U.S. PATENT DOCUMENTS 5,551,058  8/1996  Hutcheson ............................ 455/429
5,561,836  10/1996  Sowles et al. ........................ 455/428

Primary Examiner—Thanh Cong Le
Attorney, Agent, or Firm—Harold C. McGurk

[57] ABSTRACT

A method (100) and system (10) are used to expedite access for a period of time for those subscriber units (30) which have previously executed the complete home gateway access procedures. By checking certain information sent by a subscriber unit (30) upon initialization and determining whether the information falls within a predetermined period of time, a home gateway (40) directly notifies a visited gateway (41) to handle the call setup and bypasses the need to reexecute the full access procedures at the home gateway (40).

13 Claims, 2 Drawing Sheets

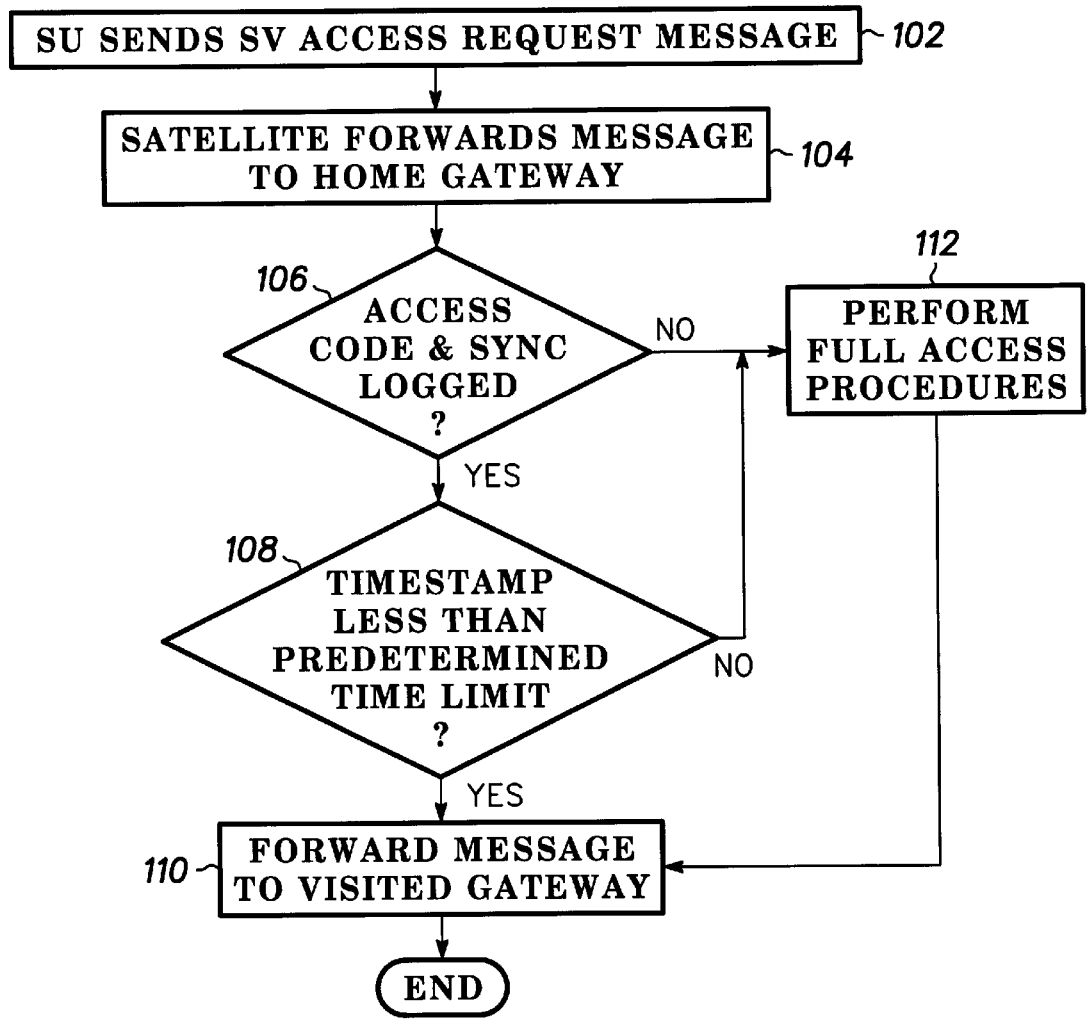

EXPEDITED HOME GATEWAY ACCESS METHOD AND SYSTEM

TECHNICAL FIELD

This invention relates generally to space-based communication systems and, in particular, to a system and method that expedites subscriber unit procedures for accessing the communication system.

BACKGROUND OF THE INVENTION

When a subscriber unit requests service in conventional space-based or terrestrial communication systems, the system responds by executing a home gateway access procedure. The home gateway access procedure performs one or more geolocation measurements to determine the location of the mobile subscriber unit for the purpose of deciding whether it should be allowed access into the network (i.e., certain users may be blocked from accessing the network from certain areas). When a subscriber is provisioned for service, a service provider ID (SPID) is placed in the subscriber's subscriber unit to identify the country of origin of the subscriber. The home gateway access procedure performs calculations to locate a subscriber and checks the calculated location against a list of approved service providers. This feature permits system providers to enforce political sovereignty (e.g., country A may have a political disagreement with country B, and the home gateway access procedure allows country A to deny system access when any country B subscribers roam into country A). The location calculation is then used to compute which visited gateway should control the call. This selection is usually based on which gateway is closest to the subscriber, but other criteria may be used as well.

The home gateway access procedure may cause considerable delay in the network as the network approaches full capacity. Thus, there is a significant need for a system and method that bypass the home gateway access procedure to reduce call setup delay.

BRIEF DESCRIPTION OF THE DRAWINGS

FIG. 3 shows a flowchart of a method for bypassing the home gateway access procedure according to a preferred embodiment of the present invention.

DESCRIPTION OF THE PREFERRED EMBODIMENTS

The present invention has utility in that a home gateway access procedure is not executed every time a subscriber unit requests service. The present invention allows a subscriber unit to bypass an entire home gateway access procedure (including geolocation checks) by remembering whether the subscriber unit recently executed the home gateway access procedure. The present invention also provides expedited handling for a subscriber unit that had recently executed the home gateway access procedure.

A "satellite" as used throughout this description means a man-made object or vehicle intended to orbit the earth. A "satellite" comprises geostationary satellites, or satellites orbiting the earth at low-earth or medium-earth altitudes and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based communication systems and/or combinations thereof.

Figure 1:
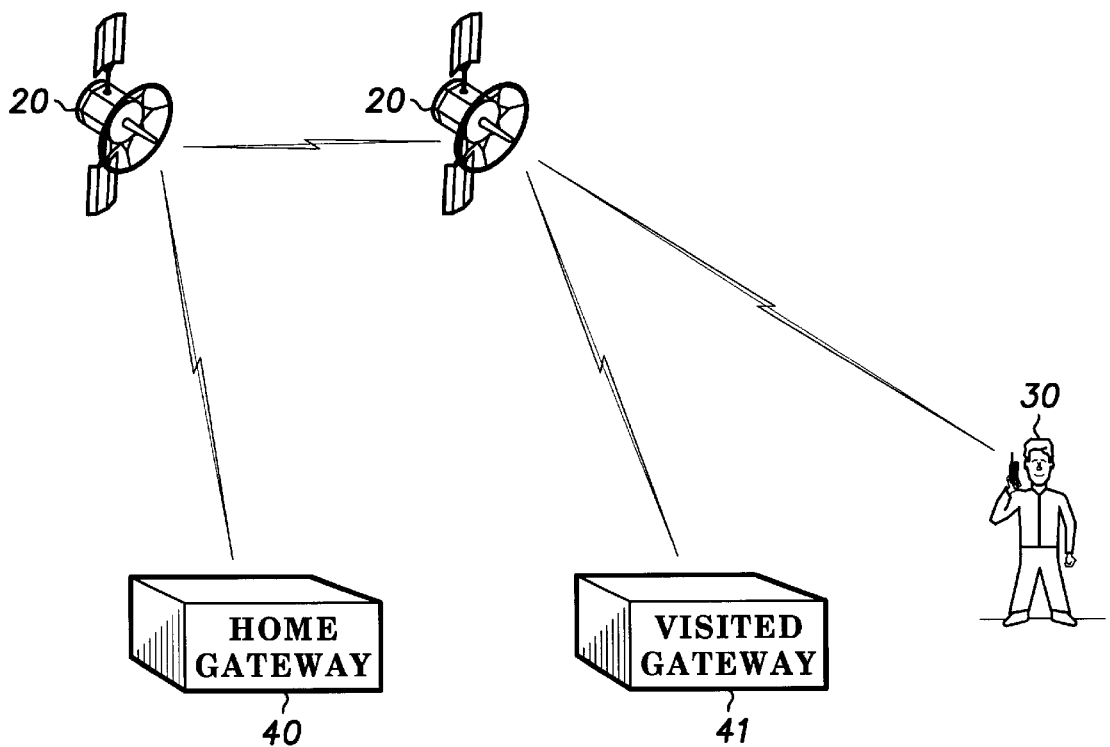
FIG. 1 shows a general view of a space-based communication system according to a preferred embodiment of the present invention.

FIG. 1 shows a general view of space-based communication system 10 according to a preferred embodiment of the present invention. Although FIG. 1 illustrates a highly simplified diagram of communication system 10, system 10 comprises at least one satellite 20, any number of subscriber units 30 and home gateway 40 and at least one visited gateway 41. Generally, communication system 10 may be viewed as a network of nodes. All nodes of communication system 10 are or may be in data communication with other nodes of communication system 10 through communication links. In addition, all nodes of communication system 10 are or may be in data communication with other telephonic devices dispersed throughout the world through public switched telephone networks (PSTNs) and/or conventional terrestrial communication devices coupled to a PSTN through conventional terrestrial base stations.

The present invention is applicable to space-based communication systems that assign particular regions on the earth to specific cells on the earth, and preferably to systems that move cells across the surface of the earth. Although the present invention is applicable to space-based communication systems 10 having at least one satellite 20 in low-earth, medium-earth or geosynchronous orbit, satellite 20 is preferably in low-earth orbit around earth. Satellite 20 may be a single satellite or one of many satellites in a constellation of satellites orbiting earth. The present invention is also applicable to space-based communication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on the earth's surface).

Each satellite 20 communicates with other adjacent satellites 20 through cross-links. These cross-links form a backbone of space-based mobile communication system 10. Thus, a call or communication from one subscriber unit located at any point on or near the surface of the earth may be routed through a satellite or a constellation of satellites to within range of substantially any other point on the surface of the earth. A communication may be routed down to a subscriber unit (which is receiving the call) on or near the surface of the earth from another satellite 20. How satellite 20 physically communicates with subscriber units 30 and gateways 40, 41 is well known to those of ordinary skill in the art.

Subscriber units 30 may be located anywhere on the surface of earth or in the atmosphere above earth. Communication system 10 may accommodate any number of subscriber units 30. Subscriber units 30 are preferably communication devices capable of receiving voice and/or data from satellites 20 and/or gateway 40. By way of example, subscriber units 30 may be hand-held, mobile satellite cellular telephones adapted to transmit to and receive transmissions from satellites 20 and/or gateways 40, 41. Moreover, subscriber units 30 may be computers capable of sending email messages, video transmitters or facsimile machines just to name a few.

How subscriber units 30 physically transmit voice and/or data to and receive voice and/or data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Home gateway 40 communicates with and may control satellite 20. There may be multiple visited gateways 41 located at different regions on the earth. For example, there may be one gateway 41 located in Honolulu, another located in Los Angeles and another in Washington, D.C. Another example is to have separate gateways 41 located in each country on the earth. Gateways 40 may provide satellite control commands to satellite 20 so that satellite 20 maintains its proper position in its orbit and performs other essential house-keeping tasks. Gateways 40, 41 may be additionally responsible for receiving voice and/or data from satellite 20. How gateways 40, 41 physically communicate with satellites 20 and/or subscriber units 30 is well known to those of ordinary skill in the art.

A "gateway" 40 as referred to throughout this description includes home gateways, visited gateways, alternate home gateways, alternate visited gateway, ground stations, ground control stations, base stations, earth terminals or any other term representing a facility that determines which satellite or base station should service a particular subscriber unit. A "home gateway" is the subscriber unit's main gateway where its information is stored. In the preferred embodiment, a home gateway is where the subscriber (e.g., user) was assigned at sign-up to use the space-based system. In alternative embodiments, a home gateway is according to where the subscriber user lives (or has his/her home). A "visited gateway" is not a home gateway for particular subscriber unit, but a gateway that has subscriber units assigned to it according to particular criteria.

Figure 2:
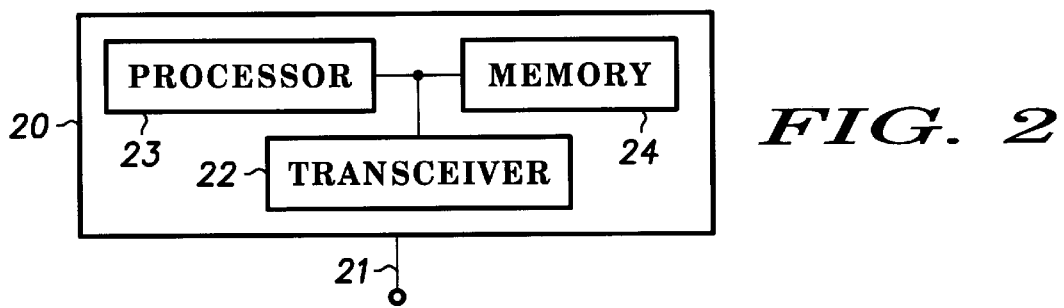
FIG. 2 shows a general view of the components of a satellite, a home gateway and a visited gateway according to preferred embodiment of the present invention.

FIG. 2 shows a general view of the components of satellite 20 and/or gateways 40, 41 according to a preferred embodiment of the present invention. For purposes of this description, reference will be made to satellite 20, although most of the components are similar to those in gateway 40. Satellite 20 comprises at least the following components: antenna 21, transceiver 22, processor 23 and memory 24. There may be other components of satellite 20 that are not shown which are necessary for operating a satellite but are not important to the present invention. These other components are well known to those of ordinary skill in the art, including for example, solar arrays and fuel propulsion system in satellites 20, or switches and network routers in gateways 40. Moreover, there may be more than one of the components in satellite 20, such as multiple processors 23, for example.

Antenna 21 of satellite 20 is coupled to transceiver 22, while transceiver 22, processor 23 and memory 24 are inter-coupled to each other. Transceiver 22 is able to transmit or receive data or voice, and may be for example, a modem. Transceiver 22 is also capable of receiving data from subscriber units 30 and/or gateway 40. Processor 23, via a software program controls the operation of satellite 20 and the other components of satellite 20. Memory 24 stores part of the software executable version of method 100 (described below) and other software programs. Antenna 21, transceiver 22, processor 23 and memory 24 are all well known to those of ordinary skill in the art.

FIG. 3 shows a flowchart of method 100 for bypassing a home gateway access procedure if it was recently executed. Method 100 is executed by different parts of the communication system 10, including but not limited to subscriber unit 30, servicing satellite(s) 20, home gateway 40 and visited gateway 41, all which are shown in FIG. 1.

According to FIG. 3, a subscriber unit (when activated by a subscriber) sends in step 102 a message to a satellite serving a region on the earth where the subscriber unit is located. The message, known as a satellite access request message, can have any format and requests access to the space-based communication system. The satellite access request message includes an identification of the subscriber's home gateway, a subscriber identifier code (SIC) and an access code. The subscriber identifier code is a unique number assigned to each subscriber unit in the system and is one of the new features of the present invention. The access code defines the location of the home gateway and is used by the constellation of satellites to route the access request to that particular home gateway. The access code may also identify a subscriber class of the subscriber.

In step 104, the satellite servicing the subscriber unit determines where the home gateway is located and forwards the message to the home gateway. This message, known as a home gateway access request message, can have any format and includes the subscriber identifier code and access code. The home gateway could be serviced by the same satellite that is servicing the subscriber unit, in which case, the satellite directly forwards this message to the home gateway. If the home gateway is being serviced by another satellite, the satellite servicing the subscriber unit routes the home gateway access request message through the constellation of satellites to reach the satellite that is servicing the home gateway.

Once the home gateway access request message reaches the home gateway, the home gateway checks in step 106 to determine if it has a record (or log) of the access code which is contained in the message. If there is such a record, the home gateway next determines in step 108 whether a time stamp associated with the record is less than a predetermined time limit. The time stamp is given by the home gateway each time the full access procedure is executed. This allows the home gateway to remember the time of the last full access procedure and bypass it for a predetermined time limit for this subscriber. The time-stamp also allows the home gateway to skip lengthy location determination calculations if it is assumed that the subscriber could not have moved a great distance within the specified time period, and therefore an additional location calculation is not needed. Relieving the home gateway from this calculation allows those home gateway resources to be used for other tasks, such as handling a greater number of revenue-bearing traffic channels. The subscriber also notices a decrease in the time required to set up the call.

The predetermined time limit is set to a duration for which it is reasonable to assume the normal access procedure would yield the same result. In the preferred embodiment, the predetermined time limit is set to one hour. Different predetermined time limits could be assigned for different types of subscriber units (e.g., regular low-medium speed subscriber units vs. high-speed aeronautical subscriber unit). The type of subscriber unit could be included in the home gateway access request as part of its identification.

If the time stamp has not exceeded the predetermined limit, the home gateway obtains a record of the visited gateway selected during the initial access and immediately forwards in step 110 a visited gateway assignment message to the selected visited gateway through the constellation of satellites. The visited gateway assignment message can have any format, and is a message that informs the visited gateway to service the subscriber unit. Thereafter, the visited gateway executes any additional call setup and maintenance procedures to allow the subscriber unit access to the space-based communication system.

If the home gateway does not find a record of the access code in step 106 or determines in step 108 that the time since the initial access has been too long, the home gateway initiates in step 112 the full access procedure. The full procedure creates a new record or updates an old record to save the access code, the subscriber identifier code, identification of the selected visited gateway and the time stamp of this access. After the home gateway creates or updates the records, the home gateway routes in step 110 the visited gateway assignment message to the selected visited gateway to inform the visited gateway to set up the call requested by the subscriber unit. After step 110, method 100 ends.

It will be appreciated by those skilled in the art that the present invention includes a method that allows expedited access for a period of time for those subscriber units which have previously executed the complete access procedures. Another advantage of the present invention is that the average network call setup delay is reduced. Yet another advantage of the present invention is to allow the subscriber unit to bypass the entire home gateway access procedure (including geolocation checks) by allowing the home gateway to remember the subscriber unit and provide expedited handling to it. Another advantage is to reduce average network call setup times for subscriber units involved in multiple calls from the same area during a predetermined period of time. Another advantage is the network resources needed to perform the full access process are reduced.

Accordingly, it is intended by the appended claims to cover all modifications of the invention which fall within the true spirit and scope of the invention.

What is claimed is:

1. A method for bypassing a home gateway access procedure, comprising the steps of:

a) receiving a first message which requests a call, the first message including an access code;

b) informing a visited gateway to set up the call if there is a record of the access code and if a time stamp of the access code is less than a predetermined time limit; and c) performing a full access procedure if there is no record of the access code or if the time stamp of the access code is greater than the predetermined time limit.

2. A method as recited in claim 1, further comprising the step of a subscriber unit sending the first message.

3. A method as recited in claim 2, further comprising the steps of:

a serving satellite receiving the first message; and the serving satellite routing the first message to a home gateway.

4. A method as recited in claim 3, further comprising the step of the serving satellite routing the first message through a plurality of satellites to reach the home gateway.

5. A method as recited in claim 1, wherein the first message includes identification of a home gateway and subscriber identification codes.

6. A method as recited in claim 1, wherein step (a) comprises the step of a home gateway receiving the first message.

7. A method as recited in claim 1, wherein step (b) comprises the step of the home gateway informing a visited gateway to process the call if there is the record of the access code and if the time stamp of the access code is less than the predetermined time limit.

8. A method as recited in claim 1, wherein step (b) comprises the step of the home gateway forwarding a second message to a visited gateway through a plurality of satellites.

9. A system comprising:

a home gateway that is capable of receiving a first message including an access code and of sending a second message to a visited gateway to set up a call if there is a record of the access code and if a time stamp of the access code is less than a predetermined time limit, the home gateway also being capable of performing a full access procedure if there is no record of the access code or if the time stamp of the access code is greater than the predetermined time limit; and the visited gateway that is capable of setting up the call after receiving the second message.

10. A system as recited in claim 9, further comprising: a subscriber unit that is capable of sending the first message.

11. A system as recited in claim 10, further comprising: a serving satellite that is capable of receiving the first message and of routing the first message to the home gateway.

12. A system as recited in claim 11, further comprising a plurality of satellites that route the first message from the serving satellite through the satellites to the home gateway.

13. A system as recited in claim 9, further comprising a plurality of satellites that are capable of routing the second message to the visited gateway.

* * * * *